US008479022B2

(12) United States Patent
Dahan et al.

(10) Patent No.: US 8,479,022 B2
(45) Date of Patent: *Jul. 2, 2013

(54) SECURE MODE INDICATOR FOR SMART PHONE OR PDA

(75) Inventors: Franck B. Dahan, Nice (FR); Bertrand Cornillault, Le Bar-sur-Loop (FR)

(73) Assignee: Texas Instruments Incorporated, Dallas, TX (US)

( * ) Notice: Subject to any disclaimer, the term of this patent is extended or adjusted under 35 U.S.C. 154(b) by 1901 days.

This patent is subject to a terminal disclaimer.

(21) Appl. No.: 10/322,893

(22) Filed: Dec. 18, 2002

(65) Prior Publication Data
US 2004/0123118 A1    Jun. 24, 2004

(30) Foreign Application Priority Data

Jan. 16, 2002  (EP) ..................................... 02290115
Jun. 30, 2002  (EP) ..................................... 02100727
Nov. 25, 2002  (EP) ..................................... 02292912

(51) Int. Cl.
    *G06F 21/00* (2006.01)
(52) U.S. Cl.
    USPC .......................................... 713/194; 713/189
(58) Field of Classification Search
    USPC .................................. 713/189, 194
    See application file for complete search history.

(56) References Cited

U.S. PATENT DOCUMENTS

| 4,368,357 | A | * | 1/1983 | Gurak .................................. 380/2 |
| 5,615,263 | A | * | 3/1997 | Takahashi ..................... 713/164 |
| 5,745,676 | A | * | 4/1998 | Hobson et al. .................. 726/23 |
| 5,822,435 | A | * | 10/1998 | Boebert et al. ................ 713/192 |
| 6,092,202 | A | * | 7/2000 | Veil et al. ........................ 726/27 |
| 6,389,542 | B1 | * | 5/2002 | Flyntz ............................. 726/17 |
| 6,393,139 | B1 | * | 5/2002 | Lin et al. ....................... 382/124 |
| 6,914,897 | B1 | * | 7/2005 | Schuster et al. .............. 370/352 |
| 6,931,521 | B2 | * | 8/2005 | Hubert et al. ..................... 713/1 |
| 2003/0079158 | A1 | * | 4/2003 | Tower et al. .................... 714/23 |

FOREIGN PATENT DOCUMENTS

WO         9961989 A1        12/1999

* cited by examiner

*Primary Examiner* — Michael Pyzocha
(74) *Attorney, Agent, or Firm* — Robert D. Marshall, Jr.; Wade James Brady, III; Frederick J. Telecky, Jr.

(57) ABSTRACT

A digital system is provided with a secure mode ($3^{rd}$ level of privilege) built in a non-invasive way on a processor system that includes a processor core, instruction and data caches, a write buffer and a memory management unit. A secure execution mode is thus provided on a platform where the only trusted software is the code stored in ROM. In particular the OS is not trusted, all native applications are not trusted. The secure mode is entered through a unique entry point. The secure execution mode can be dynamically entered and exited with full hardware assessment of the entry/exit conditions. A secure mode indicator is provided to tell a user of the digital system that the device is in secure mode. This indicator may be a small LED, for example. The user should not enter any secret information (password) or should not sign anything displayed on the screen if the secure mode indicator is not active.

12 Claims, 5 Drawing Sheets

US 8,479,022 B2

SECURE MODE INDICATOR FOR SMART PHONE OR PDA

This application claims priority under 35 USC 119(a) to European patent application Serial Number 02292912.9, filed Nov. 25, 2002, entitled Secure Mode Indicator for Smart Phone or PDA; to European patent application Serial Number 02290115.1, filed Jan. 16, 2002, entitled Secure Mode For Processors Supporting MMU And Interrupts; and to European patent application Serial Number 02100727.3, filed Jun. 30, 2002, entitled Secure Mode For Processors Supporting MMU And Interrupts.

FIELD OF THE INVENTION

This invention generally relates to microprocessors, and more specifically to improvements in security mechanisms to support secure software services.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

An operating system (OS) is generally provided to manage the digital system by controlling resources and scheduling execution of various program modules or tasks. In a system with several processors, it may be convenient to have a separate OS for each processor. Generally an OS assumes that it is in control of all system resources. Many OSs were not designed in a manner to share memory and resources with another OS. Therefore, when two or more OSs are combined in a single system, resource allocation problems may occur. Conflicts over use of memory or peripheral devices may have dire consequences for system operation.

Most processors are built with 2 levels of privilege: one for the OS, and another one for user tasks. There have been proposals for a third privilege level but this is seldom implemented in current CPUs.

A few operating systems have been certified as secure for specific financial or safety critical applications. Some general-purpose operating systems claim to have security built in but their fragility is well publicized.

Hardware mechanisms can be employed to improve security. For example, U.S. Pat. No. 4,590,552, entitled Security Bit For Designating The Security Status Of Information Stored In A Nonvolatile Memory discloses a mechanism for securing data storage by providing one or more security bits that can be permanently set to inhibit off-chip resources from accessing on-chip memory, thereby protecting code or data stored in the on-chip memory. However, errant operation of the operating system may overcome such security measures.

On a smart device enabled for a secure class of applications such as for m-commerce (mobile commerce) or e-banking (electronic banking), the user is asked to enter secret information such as a password on the keyboard or to sign messages displayed on the screen. When doing so, the user has no other choice then to fully rely on the integrity of his device. However, there is no way for the user to detect that a hacker or a virus has defeated the security framework of his device.

Thus, improvements in system security are needed.

SUMMARY OF THE INVENTION

In general, and in a form of the present invention, a digital system is provided with a secure mode ($3^{rd}$ level of privilege) built in a non-invasive way on a processor system. A secure execution mode is thus provided on a platform where the only trusted software is the code stored in on-chip ROM. An indicator means observable by a user of the digital system is provided, wherein the indicator means can only be activated by the trusted program code while in the secure mode of operation.

In one embodiment, the secure mode is entered through a unique entry point. The secure execution mode can be dynamically entered and exited with full hardware assessment of the entry/exit conditions.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1, unless otherwise stated, and in which.

Corresponding numerals and symbols in the different figures and tables refer to corresponding parts unless otherwise indicated.

DETAILED DESCRIPTION OF EMBODIMENTS OF THE INVENTION

Sensitive information exchanges with the user, like password or messages displayed on the screen, must only be performed when the processing device is in a secure mode. An apparatus and method for providing a secure mode is described in co-related patent application Secure Mode for Processors Supporting MMU and Interrupts U.S. Serial Number 02290115.1 and EPO Serial Number 02100727.3, incorporated by reference herein. Sufficient description of secure mode is included herein to enable one skilled in the art to understand its' operation.

In secure mode, the access to a physical user interface such as a keyboard or display are restricted to secure applications through trusted drivers. The fact that accesses to the keyboard and the display are locked by the secure mode is not enough to fully secure the exchange with the user. It has now been discovered by the present inventors that there needs to be a means to indicate to the user that the OS calls the proper trusted keyboard or display driver, namely, the driver that is stored in secure memory and enters in secure mode to execute. Otherwise, if a virus/hacker manages to download a forged driver on the smart device, then the user has no way to know that he cannot rely on his device.

According to an aspect of the present invention, a smart device that executes secure applications will have in addition to the display and keypad a secure mode indicator. This indicator will tell the user that the device is in secure mode. This indicator may be a small LED, for example. The user should not enter any secret information (password) or should not sign anything displayed on the screen if the secure mode indicator is not active. If prompted to enter his pin code while the indicator is inactive, the user will understand that his device has been broken into and that the device cannot provide secure operation.

Figure 1:
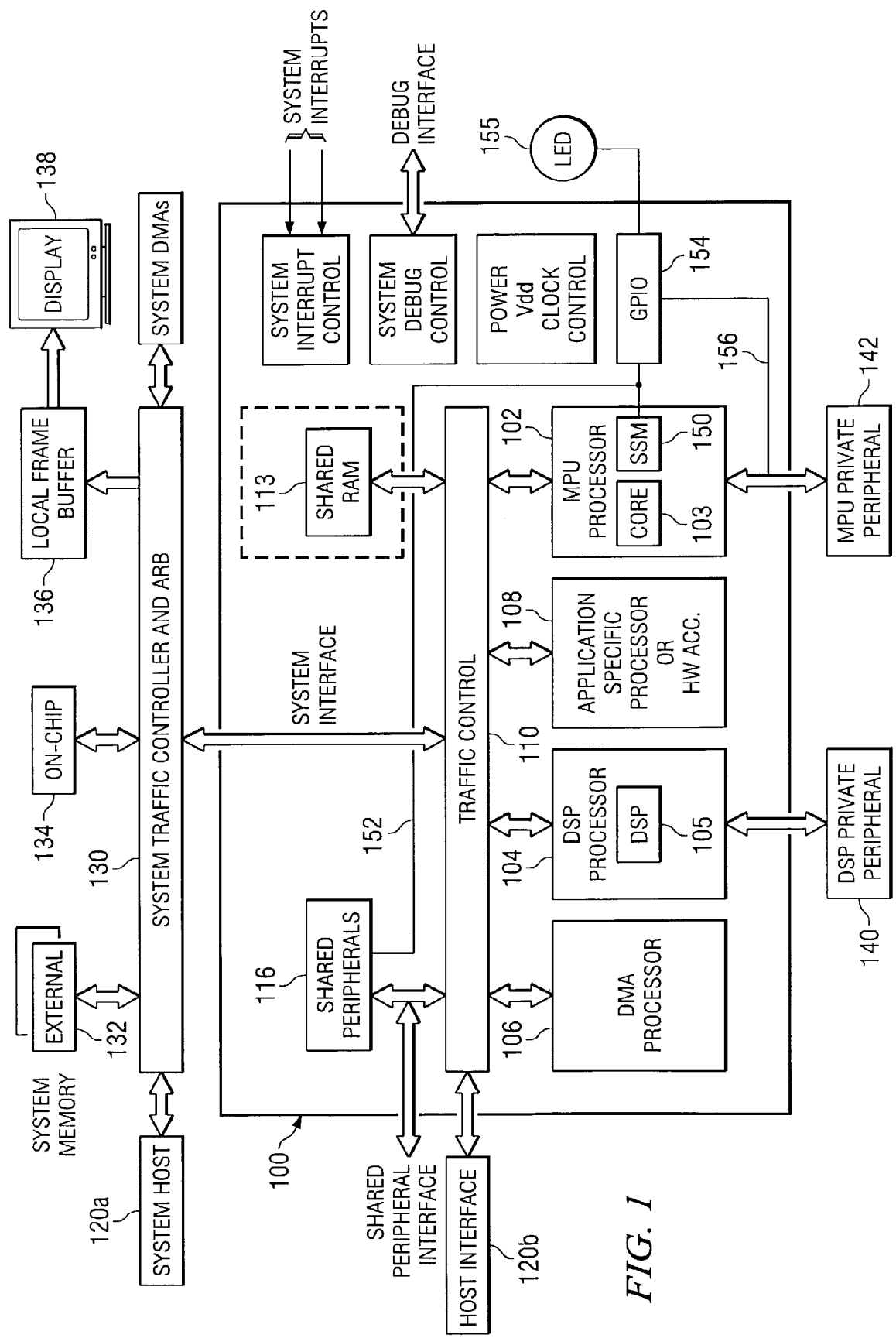
FIG. 1 is a block diagram of a digital system that includes an embodiment of the present invention in a megacell having multiple processor cores.

In order to implement this feature, a general-purpose input/output (GPIO) latch bit 154 that can only be accessed in secure mode is provided on the digital system of FIG. 1. This secure GPIO latch is used to drive the security indicator LED 155. The trusted keyboard and display driver that are running in secure mode from the secure ROMI/SRAM (read only memory/static random access memory) is responsible for managing the secure GPIO latch.

The secure mode indicator must be independent of the keyboard and display since non-secure application software can access these devices in non-secure mode. In particular, a message such as "enter password now" displayed on the screen is generally not reliable. Furthermore, a symbol or message displayed on the screen, such as a lock symbol to indicate secure operation, is not trustworthy since the screen can be accessed by hacked code. The secure mode indicator must reliably indicate when and only when the device is operating in secure mode. A user should be informed not to enter any secret information, such as a password, or not to sign anything on the screen unless the secure mode indicator is active.

FIG. 1 is a block diagram of a digital system that includes an embodiment of the present invention in a megacell 100 having multiple processors 102, 104. In the interest of clarity, FIG. 1 only shows those portions of megacell 100 that are relevant to an understanding of an embodiment of the present invention. Details of general construction for digital signal processors (DSPs) are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Although the present invention finds particular application to digital systems implemented, for example, in an Application Specific Integrated Circuit (ASIC), it also finds application to other forms of systems. An ASIC may contain one or more megacells which each include custom designed functional circuits combined with pre-designed functional circuits provided by a design library.

A distributed security system using a combination of selected hardware blocks together with a protected software execution environment is provided in megacell 100. The distributed security system is a solution to address electronic commerce (e-commerce) and mobile commerce (m-Commerce) security issues within a mobile phone environment. Security issues include the following:

Confidentiality: Ensure that only communicating parties are able to understand the content of the transferred information;

Integrity: Ensure that information has not been altered during transmission;

Authentication: Ensure that other communicating party is who he claims to be;

Non-repudiation: Ensure that the sender cannot deny sending the message;

Consumer Protection: Pseudonym and anonymity;

Protection against Clone.

Current operating systems (OS) cannot be considered secure. Some OSes claim to be secure but their complexity makes this difficult to achieve or certify. For electronic-commerce and other secure transactions a secure software layer is needed. This must be transparent to existing OSes yet support memory management unit (MMU) and cache use while supporting interrupts for real time and OS support.

It has been determined that in many applications a software only solution is not robust enough and these issues can only be solved through a well combined hardware and software architecture. The secure mode used in this embodiment was developed in order to bring hardware robustness to the overall security scheme, and is based on the following assumptions:

The operating system (OS) is not trusted;

All native software running on the platform is not trusted;

The only trusted software is the code stored in the secure program ROM/SRAM;

Caches could be enabled for performance reasons;

Interrupts are enabled for real time reasons;

The MMU could be enabled for flexibility.

The above assumptions drive the following consequences. First, the OS memory management is not trusted. Namely, MMU operations and OS defined translation tables are not reliable. The secure mode should be resistant to any wrong usage of the MMU and to the fact that OS defined translation tables could be corrupted. Secondly, the OS defined interrupt vector table and interrupt service routines are not trusted. There is a need to implement a specific management of the interrupt in secure mode so that the secure mode is resistant to any wrong usage of the interrupt and to the fact that the interrupt vector table and ISR could be corrupted. Thirdly, integrity of OS basic operations like context saving, caches flush, TLB flush, Write buffer draining, etc are not ensured and the secure mode should not rely on them. Last but not least, all test, debug and emulation capability needs to be disabled in secure mode.

In this embodiment, a partitioned "Secure Mode" is created for processor 102 so that it can operate as a separate "virtual security processor" while it is executing security operations. The secure mode can be viewed as a third privilege level for processor 102. Its activation relies on the presence of special purpose hardware creating an environment for protecting sensitive information from access by non-trusted software. The secure mode is set with the assertion of a dedicated security signal 152 that propagates across the system and creates a boundary between resources that trusted software can access and those available to any software.

The secure mode activation relies also on proper control by the security software. Security software is stored in secure program ROM/SRAM and executed from there. There can exist no possible flows by which non-trusted code can either fool the hardware into entering secure Mode, or get trusted code to perform tasks it shouldn't. If the boundary is properly created, there should be no way to utilize the normal operation of the processor to move information from inside the boundary to outside, except through controlled operations. Note that normal operation of the processor includes executing potentially flawed "user-code."

The secure software layer is trusted and stored in secured memory. It is entered through a software sequence that demonstrates to a hardware security state machine (SSM) 150 that it is indeed executing secure code by passing through a single, secured gateway to secure mode while protecting against MMU modification. While the secure software is executing in secure mode, interrupt vectors are redirected so that the security control software can initiate a proper exit from the secure mode if required. The redirection process is done transparently to the OS and prevents any secure data from being visible after the transition.

GPIO latch 154 is a memory-mapped latch that operates in a conventional manner except that it can only be accessed and activated by secure software. Indicator 155 is coupled to GPIO 154 and is illuminated in response to GPIO. Indicator 155 it is turned on by writing one logical value into latch 154, such as a logical one, and turned off by writing a complimentary logical value into latch 154, such as a logical zero. Latch 154 is accessed by core 103 via peripheral bus signals 156. However, the operation of GPIO latch 154 is qualified by secure signal 152 that is controlled by SSM 150. As such, GPIO 154 can only be written to when secure signal 152 is in an active state that indicates processor 102 is executing a secure software routine. In this embodiment, indicator 155 is a light emitting diode (LED); however, in other embodiments any type of indicator may be used that conveys two different states: on and off. For example, various types of lamps can be used, such as neon, plasma, etc. Various mechanical devices may be used, such as a disc that rotates to display different colors to indicate an on/off state, or actuators that move an indicator to represent an on/off state, etc. In other embodiments, the two states can be indicated by surface changes in texture, height, temperature, etc so that a sight challenged or otherwise physically impaired person can detect each of the two states. For example, a tactile indicator can be provided in conjunction with a brail display device. In another embodiment, the indicator may provide an audio indication; for example, a tone may be played to indicate the secure mode state is on; however, some care is needed since a tone could be imitated by a non-secure audio source.

Referring again to FIG. 1, megacell 100 includes a microprocessor (MPU) 102 with a 32-bit core 103 and a digital signal processor (DSP) 104 with a DSP core 105 that share a block of memory 113 that is referred to as a level two (L2) memory subsystem. A traffic control block 110 receives transfer requests from a host processor connected to host interface 120*b*, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120*a* interacts with the external resources through system traffic controller 130. A host interface connected to traffic controller 130 allows access by host 120*a* to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2:
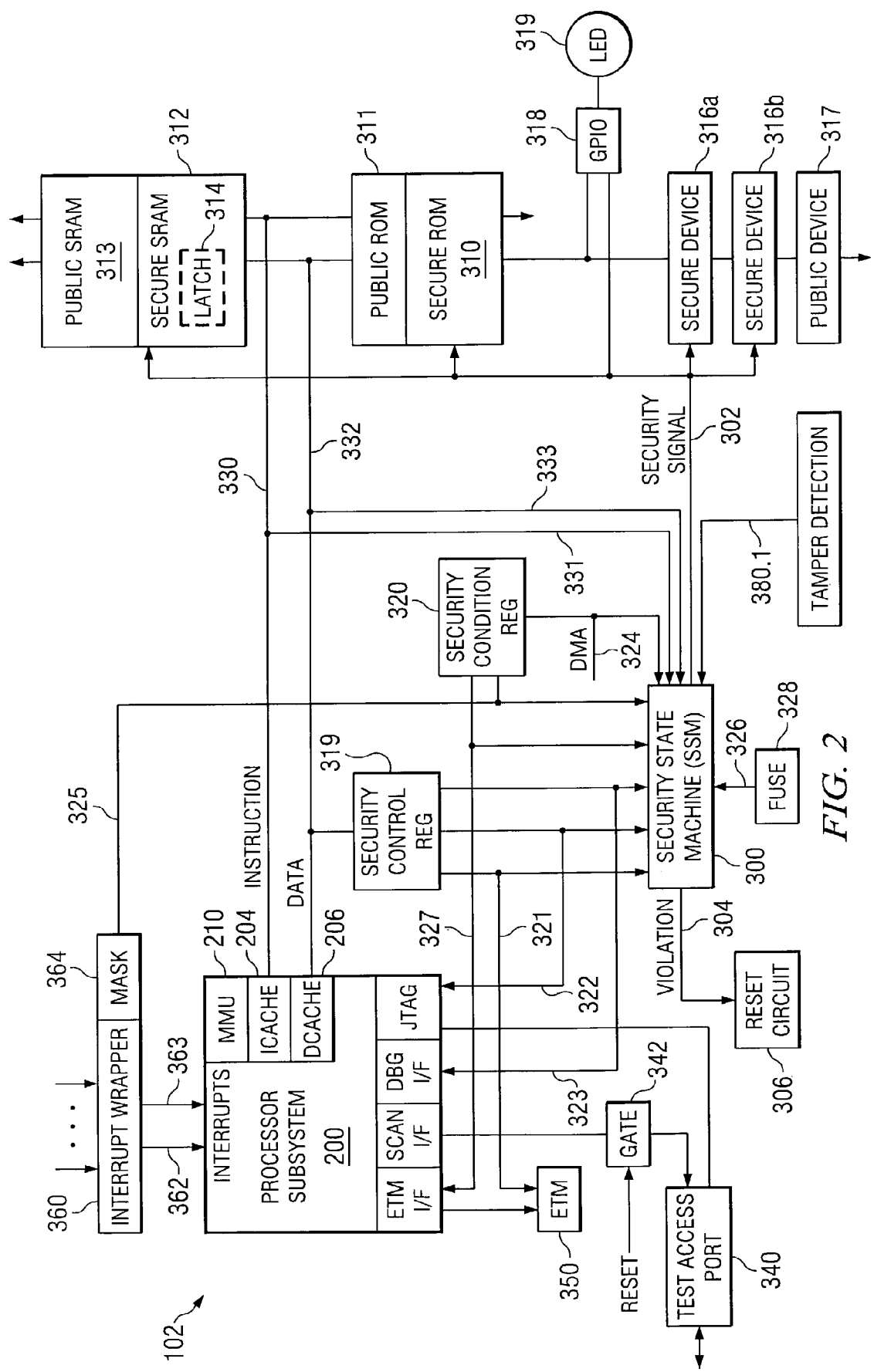
FIG. 2 is a block diagram of the MPU block in the system of FIG. 1 illustrating distributed security using a combination of selected hardware blocks together with a protected software execution environment enforced by a security state machine (SSM)

FIG. 2 is a block diagram of MPU 102 in the system of FIG. 1 illustrating distributed security using a combination of selected hardware blocks together with a protected software execution environment enforced by a security state machine 300. In another embodiment of a digital system, processor 102 may exist as a single processor, or may be coupled to one or more other processor for co-operative operation, for example.

The secure mode is a "third level of privilege" for processor 102. The secure mode provides hardware means to restrict access to secure resources of processor subsystem (CPU) 200 provided the appropriate execution environment is set. Secure mode is built around CPU 200 that includes a processor core, data and instruction caches 204, 206, and an MMU 210. Advantageously, the security features of the present embodiment are non-invasive to CPU 200, such that another processor can be used in place of the present processor in another embodiment.

The security hardware is of two kinds: the logic that controls the security signal, and the hardware resources restricted to secure mode. The former is mainly composed of security state machine (SSM) 300. SSM 300 is in charge of monitoring the conditions for entering into secure mode, asserting/de-asserting security signal 302 and detecting secure mode violations. A violation is indicated by asserting violation signal 304 that is connected to reset circuitry 306 to cause a system reset when a security violation is detected. The security state machine monitors various signals 330 from processor 200's external interfaces and in particular, the addresses fetched by the processor on the instruction bus. The security state machine is tightly coupled to low-level assembly code from the entry sequence. It reacts to events generated by the entry sequence on the monitored signals.

The secure mode is entered when security signal 302 is asserted. When the security signal is asserted, it propagates throughout the system to unlock access to the secure resources. Only processor 200 can access the secure resources in secure mode. DSP 104 and DMA 106 are not granted access to secure resources by design constraints in this embodiment. The secure resources in this embodiment include: secure ROM 310 (part of the total ROM), secure SRAM 312, and various secure peripheral devices 316*a,b*. Access to GPIO latch 318 is likewise qualified by security signal 302 such that GPIO 318 can only be written to when secure signal 302 is in an active state that indicates CPU 200 is executing a secure software routine. Security signal 302 is asserted by security state machine (SSM) 300 under certain conditions. In secure mode, CPU 200 can only execute code that is stored in secure ROM 310 or secure SRAM 312. Any attempt to run code stored outside of these trusted locations will generate a "security violation" by asserting signal 304 that will cause reset circuitry 306 to perform a global reset of the system.

This ROM is partitioned in two parts: a secure portion of the ROM that is protected by the secure bit and can only be accessed in secure mode; and a public portion of the ROM that is always accessible and contains the boot area. Public ROM 311 also contains various security procedures and participates in the overall security scheme.

Secure storage RAM 312 is where secure working data are stored (secure stack, secure global data, secure heap). ☐☐☐Secure Program RAM 312 (optional) is dedicated to the execution of non-resident secure code. Non-resident secure code is first downloaded in the secure program RAM from an external memory device and then it is authenticated prior to being executed.

A few byte addresses in the secure storage SRAM are implemented with registers 306 that are reset by the global reset signal. These registers shadow a few normal SPAM locations and can be used as generic SRAM addresses. The only difference is that these registers/SRAM locations will be reset to a value of all 1's. It is useful in secure mode to have few variables that can be reset and therefore have a known initial value and that can only be changed in secure mode. For example, this feature can be used to: detect first entry in secure mode; set a proper exit_mode value (normal, exception, violation); detect power up; etc. In another embodiment, these resetable values can be implemented in other ways, such as by placing the registers in address space that does not overlay the SRAM, by connecting the reset signal to selected memory cells within the SRAM, etc.

There is no software way to cause security signal 302 to be asserted or to modify the behavior of the state machine. The SSM is tightly coupled to an activation sequence that will be described in more detail with respect to FIG. 5. The SSM monitors physical instruction address bus 330 from processor 200 and various entry condition signals 321-327 received from various resources. Instruction interface signals 331 and data interface signals 333 from processor 200 are also monitored and define what type of bus transactions are being performed on instruction bus 330 and data bus 332, respectively.

The secure mode is entered by branching to a specific address in public ROM referred to as the single entry point, which is a hard coded address in the SSM. The entry point is the starting address of an "activation sequence". The activation sequence is a piece of code stored in public ROM that is coupled to the security state machine and ensures that some of the entry conditions for secure mode are met. Other entry conditions are directly assessed by monitoring the specific entry condition signals.

The activation sequence generates a defined sequence of events on some of the signals that are monitored by the security state machine. These events ensure the conditions required to enter in secure mode are met. The security state machine recognizes this pattern and asserts the security signal. In secure mode the security state machine keeps on monitoring a few signals to detect secure mode violation and ensure compliance with secure mode exit procedure. Whenever a violation occurs, the SSM releases the security signal and asserts a security violation signal 304. A typical violation is trying to fetch instructions outside of the ROM/SRAM address range.

The activation sequence is stored in the public ROM. It ensures secure mode entry conditions are met. An environment setting sequence is stored in secure ROM. It sets a proper execution environment for the secure mode where caches, interruption and MMU can be enabled. An exit sequence is stored in secure ROM. It enforces compliance with secure mode exit procedure. It provides a safe way to exit the secure mode by a BRANCH or under an interrupt. It also protects "secret" contents of the secure ROM and RAM on exit.

Referring still to FIG. 2, security control register 319 is accessible as a memory mapped register in secure mode only and is used to enable/disable the test, debug and emulation facilities that could be used by a hacker to breach security but are necessary to qualify and debug system hardware and software. For example, one bit represented by signal 321 enables/disables operation of embedded trace macro-cell (ETM) 350 used for program development. Signal 322 enable/disables operation of the JTAG interface on processor 200. Signal 323 enable/disables operation of a debug interface (dbg I/F) on processor 200.

Security condition register 320 is accessible as a memory mapped register in non-secure mode and is used to set some of the entry conditions in secure mode by controlling the operating mode of various resources that could be used by a hacker to breach security. Signals issued from the security condition register are also monitored by the state machine. For example, direct memory access (DMA) enable signal 324 is used to enable a DMA controller (not shown) that can access secure memory 312.

In this embodiment, a scan chain interface (Scan I/F) is provided for testing and could provide a security breach point. However, processor 200 provides no means to disable the scan chain output. In order to avoid modifying internal signals of processor 200, a scan gate 342 is provided externally that is used to mask the scan output of processor 200 for a number of clock cycle equal to the longest scan chain within processor 200. This masking scheme is initialized (counter reset) at reset and each time the device is switched from functional to test mode with scan enabled under control of external test equipment (not shown).

An external interrupt handler 360 is provided to receive a set of interrupt signals and multiplex these into two interrupt signals 362, 363 that are then received by processor 200. Interrupt handler 360 has a global mask bit 364 that can be set by software and allows software to globally disable all the interrupts to the processor. The interrupt controller asserts a mask signal 325 whenever the global mask bit is set and interrupt signals 362, 363 are inactive. After mask signal 325 is asserted, interrupt signals 362, 363 output by the interrupt controller cannot be asserted anymore until after the global mask bit is cleared by software. SSM 300 monitors mask signal 325 to determine if interrupts are enabled or masked.

Booting from an external memory is a common means for a hacker to thwart security in a system. In this embodiment, external booting is prevented. In addition, SSM 300 monitors boot signal 327 that is asserted when an external boot is attempted. However, during program development it may be beneficial to allow external booting in order to better debug software. Fuse circuit 328 is provided to distinguish a development device from a production device. Device-type signal 326 is monitored by SSM 300 so that a relaxed security mode can be provided on development devices. For development devices, SSM 300 ignores boot signal 327.

Figure 3:
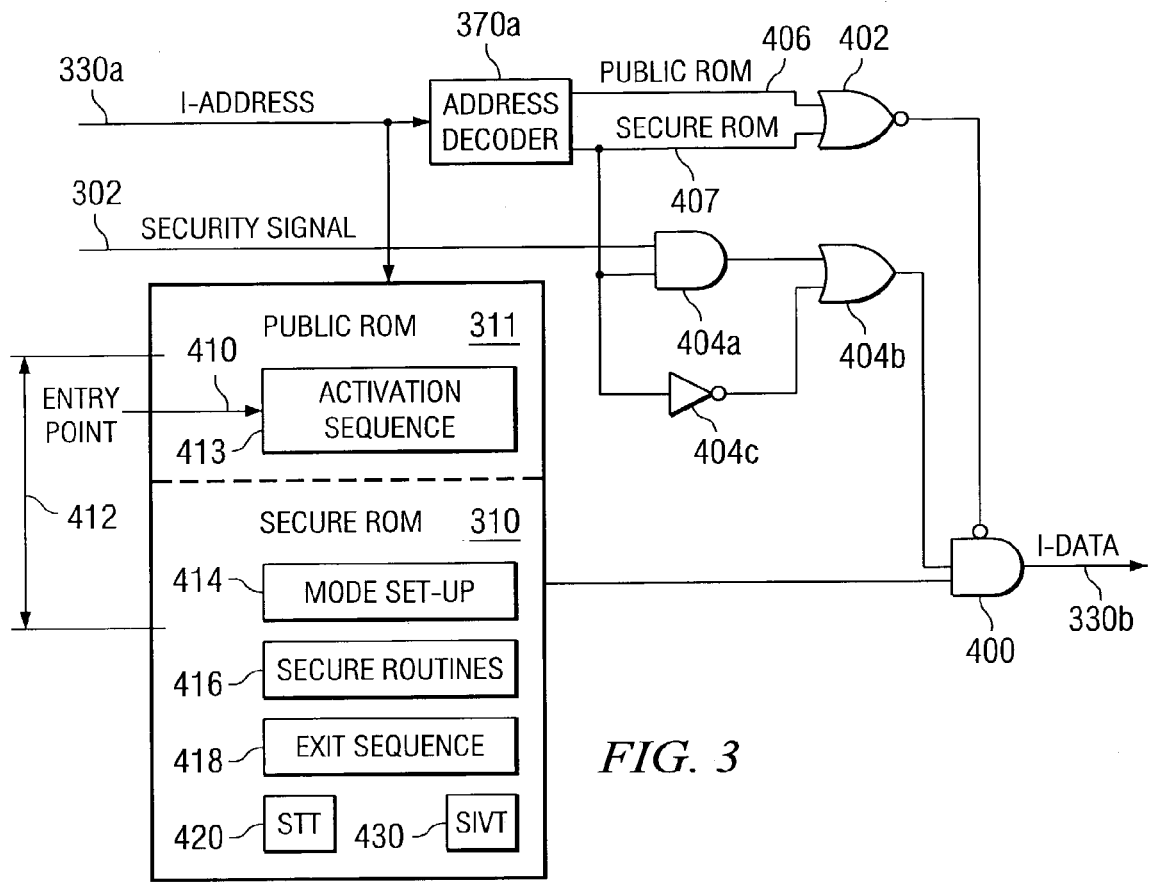
FIG. 3 is a block diagram illustrating contents of the ROM of FIG. 2 and circuitry for segregating the ROM into a public portion and a secure portion.

FIG. 3 is a block diagram illustrating contents of the ROM of FIG. 2 and circuitry for segregating the ROM into a public portion and a secure portion. Public ROM 311 and secure ROM 310 are implemented as a single ROM in this embodiment. In another embodiment, they may be separated without affecting the inventive aspects herein. Address decoder circuit 370a is a portion of decode circuit 370 that decodes accesses to the ROM. Similar circuitry is provided for the SRAM and other instruction or data bus connected devices.

Driver circuit 400 is enabled to provide requested instruction data on instruction bus 330b whenever an address corresponding to ROM 310, 311 is asserted on instruction address bus 330a in response to an address decode signal 406 or 407 corresponding to a public ROM address or a secure ROM address, respectively.

As mentioned above, if a secure resource is accessed when not in secure mode, dummy data is provided. Gate circuit 404 monitors security signal 302 and secure ROM decode signal 407 and causes driver circuit 400 to pass null data if the secure ROM is being accessed and the security signal is not asserted.

Secure Mode

Figure 4:
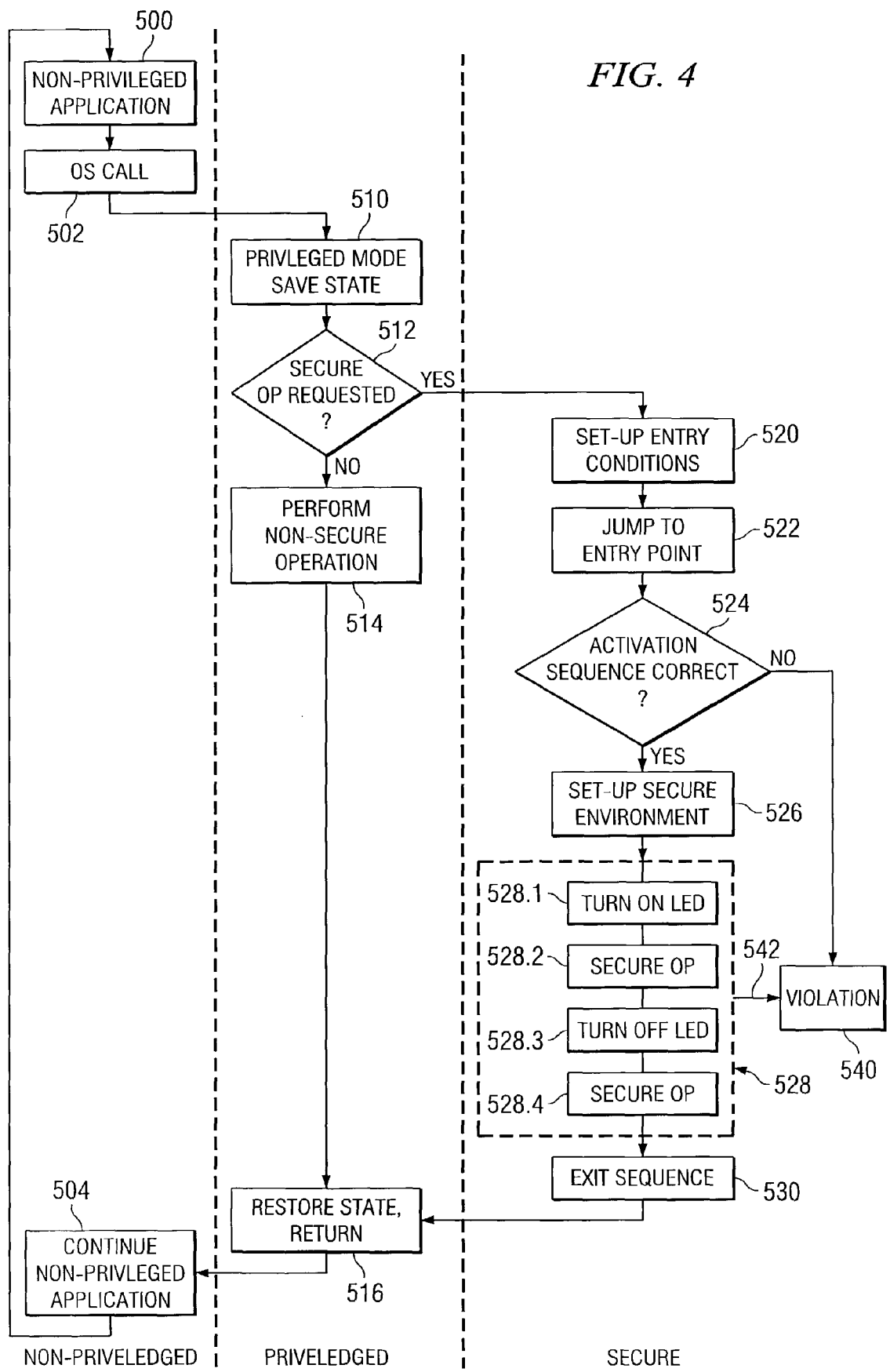
FIG. 4 is a flow chart illustrating access to a secure mode of operation on the system of FIG. 2.

FIG. 4 is a flow chart illustrating access to a secure mode of operation on the system of FIG. 2, which will now be described in more detail. Steps 500, 502, 504 represent an application program being executed on processor 200 in a normal, non-privileged level of execution. On occasion, a call 502 is made to an operating system (OS) for service in a privileged level of operation, as represented in steps 510, 512, 514, 516. Upon being called, the OS saves state and switches to privilege mode in step 510, performs the privileged operation in step 514, restores state in step 516 and returns to the non-privileged application at step 504. These two levels of operation are well known.

In step 512, a test is made to determine if the requested service is for a secure operation; if so, the system will enter a third level of security called secure mode. In step 520, the OS driver performs house-keeping tasks to place the system in an appropriate state for entry into a secure mode. This includes masking interrupts, setting security condition register 320 to disable the various resources that pose a security risk, and verifying that if memory management unit 210 is enabled, that a page table entry corresponding to the activation sequence is marked as "non-cacheable." This will be described in more detail later.

In step 522 and referring again to FIG. 3, a jump is made to an entry point 410 in an entry sequence 412 located in public ROM 311. The entry sequence in is a piece of code that is executed each time a "secure service" is invoked by an application prior to running any type of security code on the platform. This sequence is also executed when returning from an exception that has interrupted security code execution. The entry sequence starts at a defined address in ROM, which is hard-coded and called the "entry point." The entry sequence is composed of two parts: a security signal activation sequence 413 and secure mode environment setting sequence 414.

The purpose of the activation sequence is to take over the execution flow of the processor 200 and ensures that it cannot be preempted by any other non-trusted code. At some point during this part of the entry sequence, security signal 302 is asserted to enter secure mode and unlock access to secure resources (ROM, SRAM, peripheral devices, etc.).

The intent of environment sequence 414 is to set the environment for secure code execution. Advantageously, by setting up a secure environment it is possible to safely enable program and data caches and to handle interrupt exceptions.

Security signal activation sequence 413 is located in the public ROM while secure mode environment setting sequence 414 is located in secure ROM. The total code size of the entry sequence (part 1+part 2) is required to be smaller then 1 Kbyte so that it can be mapped in a 1 KB page, the smallest memory section in MMU translation tables for this embodiment. This way, the entry sequence virtual addresses cannot be mapped over two sections in order to preempt the processor at some judicious point during the execution of the entry sequence. It is also important that the memory page of the entry sequence is non-cacheable or the instruction cache is disabled while running the entry sequence.

Secure translation table (STT) 420 and secure interrupt vector table (SIVT) 430 will be described later.

If the 1 Kbyte code size is seen as too restrictive for a given embodiment, the MMU can be disabled at the end of activation sequence 413 and re-enabled at the end of environmental sequence 414. In this case the 1 KB limitation will only apply to the activation sequence.

Referring again to FIG. 4, the activation sequence is checked for correctness by SSM 300 in step 524, as will be described in more detail with respect of FIG. 5. If the activation sequence is not performed correctly, then SSM 300 asserts the violation signal in step 540 and the system is reset. The secure environment is set-up in step 526 by executing environment setting sequence 414, as will be described in more detail later.

Once a secure environment is established, then the requested secure operation is executed in step 528 from secure code 416 as requested initially by the non-privileged application. According to an aspect of the present invention, secure code 416 contains an instruction that writes to GPIO latch 318 in step 528.1 to turn on secure mode indicator 319 only while in secure mode. Secure code 416 may then request a user to provide confidential information in step 528.2 and then turn off the secure mode indicator in step 528.3 by again writing to the GPIO latch. Additional secure processing is done in step 528.4. It should be understood that this particular sequence is for illustration only. Other secure processing may be performed before turning on the secure mode indictor, for example. The secure mode indicator may be turned on for a while, turned off for a while and then turned on again, for example. Countless other sequences may be performed, as required by an application program.

After completion of the secure operations, the normal way to exit the secure mode in step 530 is to jump to a "normal exit sequence" in secure ROM exit sequence 418. The intent of the normal exit sequence is to comply with a secure mode exit procedure and to ensure protection of "secret" contents on exit. The normal exit sequence can be located anywhere in secure ROM; there is no hard-coded address check in the security state machine.

While in secure mode, SSM 300 continues to monitor signals 321-327 and 331. Based on these signals, the SSM can detect security violations. Whenever a violation of the secure mode occurs, the SSM detects it, releases the security signal and generates a security violation, as indicated at arc 542. The violation initiates a global reset of the device. A security violation drives the SSM into a blocking state that can only be exited by a reset. The following violations can be detected: violation 1— An instruction is fetched at an address outside the full ROM and RAM address range; violation 2— processor 200 is reset; violation 3— test, emulation, or debug features are enabled.

When an exception occurs, processor 200 jumps to the corresponding exception vector in an interrupt vector table (IVT) from where it is re-directed to the specific interrupt routine. The IVT is generally managed by the OS and it is not located in secure SRAM. Therefore, its content are not protected and cannot be trusted. Moreover, from the security point of view, it would not be acceptable to allow the processor to jump directly to the exception vector for two reasons: (1) it is incompatible with the overall security scheme; a "jump" outside the secure memory address range is considered as a security violation; (2) the caches and processor registers are full of "secret" contents and need to be cleared before releasing the secure bit and executing non-secure code. In order to allow interrupts while in secure mode, a secure IVT is provided.

Figure 5:
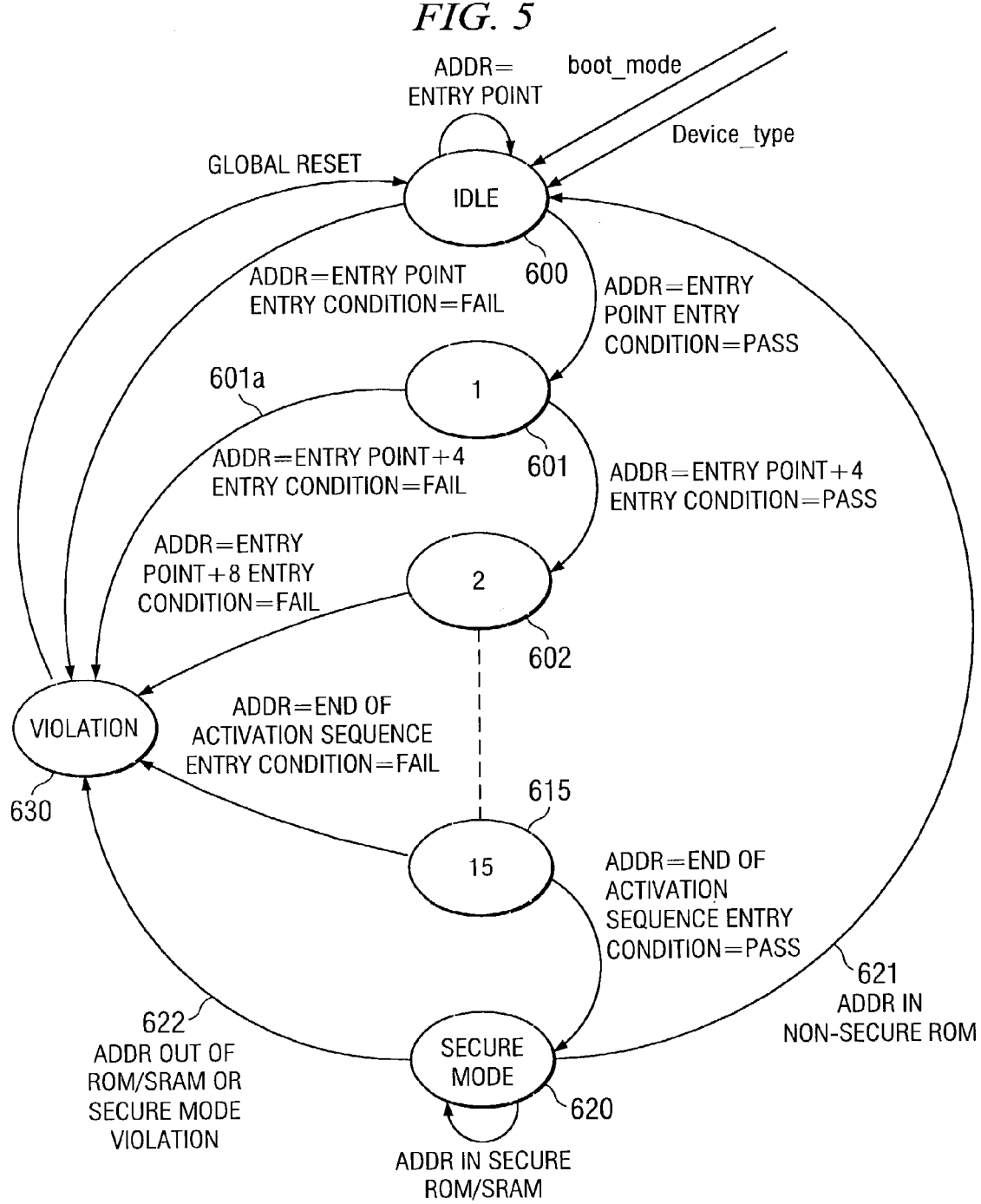
FIG. 5 is a state diagram illustrating operation of the security state machine in the system of FIG. 2.

FIG. 5 is a state diagram illustrating operation of security state machine 300 in more detail. The security state machine asserts the security signal at some point during the execution of the activation sequence in ROM in order to enter secure mode. The purpose of this part of the entry sequence is to generate a defined sequence of events on the signals that are probed by the security state machine. These events ensure the conditions required to set the security signal are met and they are tracked by the SSM. The "condition" signals are monitored throughout the activation sequence. If any of the entry conditions are not met or cease to be valid before the end of the activation sequence, the security state machine will transition to violation state 630 and assert security violation signal 304. There are two key objectives behind the entry conditions monitored by the SSM: (1) processor 200 is fetching and above all executing the activation sequence code, (2) trusted code has fully taken over the CPU execution flow and nothing could preempt it without being detected before or after the security signal is set except through controlled operations.

The activation sequence is constructed in such a way that it generates a unique pattern on the instruction address bus. The pattern is made of the (physical) address value of the activation sequence code and the relative moment in time, these addresses should appear on the bus. Nevertheless, the pattern is made independent of the memory system access latency. The exact activation sequence bus pattern is obtained from simulation and hard-coded in the SSM. The SSM thus ensures full compliance with the activation sequence bus pattern. Typically, the last instruction of the activation sequence is a branch instruction and other than a cache flush instruction or a cache disable instruction, all other instructions in the activation sequence are NOP instructions.

After secure mode is entered and the security signal has been asserted, the entry conditions are not required to be valid and the SSM does not continue to test them. However, the SSM keeps on probing various signals in order to detect secure mode violation, as will be described later. The secure mode exit conditions are not tested until after the secure memory is effectively entered.

Referring again to FIG. 5 state 600 is an idle state during which the SSM monitors address bus 330 looking for the entry point address of the entry sequence (ESA[EP]). Once the entry point address is detected, the SSM transitions to state 601 if all of the entry conditions are met, if not, it transitions to violation state 630 where violation signal 304 is asserted.

Each of states 601-615 must be sequentially traversed by detecting the correct entry sequence address and corresponding entry condition signals or else the SSM transitions to violation state 630. If the sequence is correctly traversed, then secure mode state 620 is entered and security signal 302 is asserted.

For example, in order to transition from state 600 to state 601, the address of the entry point instruction must appear along with all of the correct condition signals. The next address that appears must be the address of the next sequential instruction in order to transition to state 602, otherwise the SSM transitions to violation state 630. In a similar manner, each address of the activation sequence must appear to transition to states 602-615 and finally to secure mode state 620. An incorrect address, address timing, or an incorrect change in a condition signal will result in a transition to violation state 630, such as indicated at arc 601a. Similarly, the activation sequence is aborted if the status signals indicate that any one of the activation sequence accesses is cacheable.

While in secure mode state 620 and after the address of the secure routine (ESA[SR]) was effectively detected indicating that the secure memory was entered, if an address is detected by the SSM that lies inside the public ROM, then the SSM transitions back to idle mode 600, as indicated by arc 621. If an address is detected by the SSM that lies outside of the ROM or SRAM, or if a security violation is indicated by an incorrect change in a monitored signal, then the SSM transition to violation state 630 as indicated by arc 622.

The instruction cache is not required to be disabled during the activation sequence; non-cacheability of the instruction is enough to ensure robustness of the entry sequence. Nevertheless, having the cache disabled would eliminate hacking attempts that are based on ill-use of the cache flush mechanisms.

Secure Mode Environment Setting Sequence

Referring again to FIG. 4, in step 526 a secure environment is set-up by executing environment setting sequence 414 from secure ROM. The purpose of this sequence is to set a suitable environment for secure code execution. A secure environment allows enabling program and data caches, real time interrupts and potentially the MMU. Some of these steps are specific to secure mode operations and some are operations that should have normally been performed by the OS prior to calling the activation sequence. As discussed earlier, the secure mode cannot rely on basic OS operations. Therefore, the environment setting sequence needs to perform some of the context switch operations, such as cache flush, TLB flush, etc that are essential for the secure mode integrity.

System Embodiments

Figure 6:
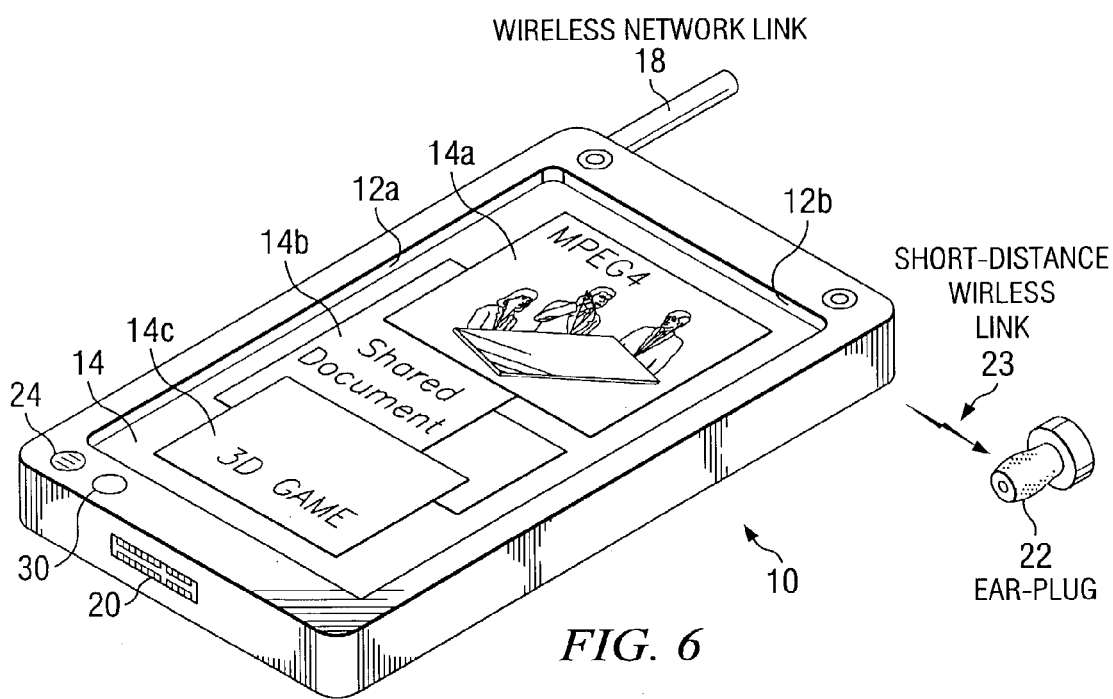
FIG. 6 illustrates a wireless personal digital assistant that includes an embodiment of the present invention.

FIG. 6 illustrates an exemplary implementation of an integrated circuit that embodies the present invention in a mobile telecommunications device, such as a mobile personal digital assistant (PDA) 10 with display 14 and integrated input sensors 12a, 12b located in the periphery of display 14. Digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless earpiece 22.

Megacell 100 provides all encoding and decoding for audio and video/graphical information being sent and received via the wireless network link and/or the wire-based network link. Advantageously, megacell 100 also provides a secure mode of operation. As described herein, a secure mode indicator lamp 30 is controlled by a latch that can only be turned on by code executed while megacell 100 is executing in secure mode. Secure mode indicator lamp 30 thereby indicates to a user of PDA 10 when it is safe to provide sensitive data to an application executing on the PDA. In this manner, PDA 10 provides a solution to address electronic commerce (e-commerce) and mobile commerce (m-commerce) security issues within a mobile phone environment.

It is contemplated, of course, that many other types of communications systems and computer systems may also benefit from the present invention. Examples of such other computer systems include portable computers, smart phones, web phones, and the like. As security is also of concern in desktop and line-powered computer systems and micro-controller applications, particularly from a reliability standpoint, it is also contemplated that the present invention may also provide benefits to such line-powered systems.

Fabrication of digital system 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice that may be sold as bare die or packaged. After packaging, finished parts are biased into an operational state and tested for operational functionality.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

Thus, a digital system is provided with a secure mode ($3^{rd}$ level of privilege) built in a non-invasive way on a processor system that includes a processor core, instruction and data caches, a write buffer and a memory management unit. A secure execution mode is provided on a platform where the only trusted software is the code stored in ROM. In particular the OS is not trusted, and all native applications are not trusted. A secure mode indicator is provided to tell the user that the device is in secure mode.

While the invention has been described with reference to illustrative embodiments, this description is not intended to be construed in a limiting sense. Various other embodiments of the invention will be apparent to persons skilled in the art upon reference to this description. For example, all manner of processor types may be improved by using secure mode aspects described herein, such as for example: RISC, CISC, wide word, DSP, etc.

In another embodiment, the secure environment may be expanded to allow sharing of secure resources between several initiator resources, such as the DSP, for example. In such an embodiment, each initiator resource could be monitored by the security state machine to enforce the security principles described above.

In various embodiments, different complements of secure hardware can be provided, including various peripherals such as watchdog timers, encryption/decryption hardware accelerator, random number generator (RNG), etc; and various I/O devices such as keypad, LCD, touch-screen, etc.

Referring again to FIG. 1, in another embodiment, a second SSM can be embodied in DSP 104 to generate a security signal in a similar manner as on processor 102 for a secure software layer that executes on DSP 104. In this embodiment, a bused version of a security signal can be included within traffic control bus 110 so that individual transactions initiated by either processor 102 or DSP 104 can be given access to secure resources, such as certain of shared peripherals 116 in accordance with the security signal generated by the respective SSMs.

Referring again to FIG. 1, in another embodiment the security signal may be extended off megacell 100 so that level three resources can be operated in a secure manner.

The activation sequence, environment set-up sequence and exit sequences may be varied according to requirements of various embodiments. For example, different instruction pipeline lengths and different cache line lengths require variations in the activation sequence. In another embodiment, housekeeping tasks performed in step 520 could be included within the activation sequence.

In another embodiment, a means for entering into a secure mode may be different from the SSM described herein. Once a secure mode of operation has been attained by any means, then access to a secure mode indicator that is available only while in secure mode is used to indicate to a user that the system is operating in secure mode.

In another embodiment, means other than a GPIO latch may be provided for activating the secure mode indicator. For example, a bit from security control register 319 may be used. Similarly, a bit from one of secure devices 316a or 316b may be used. The primary requirement is that the means be accessible only while in secure mode.

In another embodiment, the secure mode indicator may be directly responsive to the secure signal such that the secure mode indicator is active the entire time the processor is in secure mode. However, in such an embodiment, the user may perceive that indicator is on more and therefore tend to ignore it, so this is not the preferred embodiment.

Referring again to FIG. 2, secure device 316a may be an input device that is used to receive the sensitive information from the user. As such, this input device is enabled to receive sensitive information only when the system is operating in secure mode. FIG. 2 tends to show that the secure device is on-chip. This is not necessarily the case for all embodiments. It can be an off-chip device like a separate finger-print recognition device. Access to this external device can be restricted to secure mode. Typically, data exchanged with the secure external device does not need to be secret data unless it is encrypted. The external secure device may be such that it is visible to the user when the device is in operation. If the device cannot be operated outside of the secure mode, it makes it again more difficult for a hacker to fool the user.

Referring again to FIG. 2, a tamper detection device 380 may be optionally provided. An output 380.1 from tamper detection device 380 provides an indication that an access cover on an enclosure that contains CPU 200 has been tampered with. Signal 380.1 is then monitored by SSM 300 so that secure mode will not be entered if tampering is detected. Similarly, if in secure mode while tampering occurs, SSM 300 detects this via signal 380.1 and secure mode is exited an a violation is indicated, as discussed previously. The tampering detection device can also be an external off chip device. The output of the temper detection device can be monitored by the SSM or logged in a secure GPIO. The fact that the access to the GPIO is restricted to secure mode makes it impossible for a hacker to clear it. This way, the secure software will see it the next time secure mode is entered.

It is therefore contemplated that the appended claims will cover any such modifications of the embodiments as fall within the true scope and spirit of the invention.

What is claimed is:

1. A method of operating a digital system including a graphics display and secure computing resources, comprising the steps of:
   in a non-secure mode, preventing access to the secure computing resources;
   executing an application program;
   displaying results of the executing step on the graphics display;
   entering into a secure mode of operation for executing a secure portion of the application program by:
      jumping to an entry address at a particular address in an instruction memory;
      executing an activation sequence of instructions beginning at the entry address; and
      monitoring the activation sequence of instructions independently of the executing and entering the secure mode of operation only if the activation sequence of instructions is fully executed by the CPU in a pre-defined order;
   then unlocking access to the secure computing resources; and
   executing the secure portion of the application program using the secure computing resources, including activating a secure mode indicator that is independent from the graphics display;
   wherein the secure mode indicator can only be activated by the trusted program code while in the secure mode of operation.

2. The method of claim 1, wherein the last instruction of the activation sequence is a branch instruction to a secure entry address at a particular address in a secure instruction memory and other than a cache flush instruction or a cache disable instruction, all other instructions in the activation sequence of instructions are NOP instructions.

3. The method of claim 2, wherein:
   said step of entering the secure mode further comprises:
      executing a secure mode environment setting sequence of instructions located in the secure memory beginning at the secure entry address to take over execution flow and ensure that execution flow cannot be preempted by nonsecure code to set the environment for secure code execution.

4. The method of claim 3, wherein:
   a combined length of the activation sequence of instructions and the secure mode environment setting sequence of instructions is less than a smallest memory section of a memory management unit translation table.

5. The method of claim 3, wherein:
   said step of entering the secure mode further comprises:
      making a memory page of a memory management unit translation table including the activation sequence of instructions and the secure mode environment setting sequence of instructions non-cacheable.

6. The method of claim 3, wherein:
   said step of entering the secure mode further comprises:
      disabling instruction caching during execution of the activation sequence of instructions and the secure mode environment setting sequence of instructions.

7. A digital system, comprising:
   a central processing unit (CPU) for executing instructions;
   a graphics display for displaying results of the executed instructions;
   a public memory connected to an instruction bus of the CPU for holding nonsecure instructions, the nonsecure instructions including an activation sequence of instructions starting at an entry point address, the public memory being always accessible by the CPU;
   a secure memory connected to the instruction bus of the CPU for holding secure instructions, the secure memory being accessible only when a security signal is asserted;
   security circuitry having an output for asserting the security signal when a secure mode of operation is established, comprising a security state machine (SSM) connected to the CPU for monitoring a set of status signals and connected to the instruction address bus for monitoring instruction address signals, the SSM having an output for asserting the security signal when a secure mode of operation is established; and
   a secure mode indicator, independent from the graphics display and responsive to the security signal, the secure mode indicator being observable by a user of the digital system,
   wherein the secure mode indicator can only be placed in an active mode by executing an instruction while the security signal is asserted;
   and wherein the SSM has the entry point address hard coded and is operable to monitor execution of an activation sequence of instructions located in the public memory and to enter the secure mode of operation only if the activation sequence of instruction is executed by the CPU in a pre-defined order hard coded in the SSM.

8. The digital system of claim 7; wherein:
   a last instruction of the activation sequence of instructions is a branch instruction to a secure entry address at a particular address in the secure memory; and
   other instructions of the activation sequence of instructions consist of a cache flush instruction, a cache disable instruction and NOP instructions.

9. The digital system of claim 8, wherein:
   the secure memory includes a secure mode environment setting sequence of instructions located at the secure entry address, the secure mode environment setting sequence of instructions to take over execution flow and ensure that execution flow cannot be preempted by non-secure code to set the environment for secure code execution.

10. The digital system of claim 9, further comprising:
    a memory management unit including a translation table for mapping a physical address into a virtual address;
    wherein a combined length of the activation sequence of instructions and the secure mode environment setting sequence of instructions is less than a smallest memory section of a memory management unit translation table.

11. The digital system of claim 10, further comprising:
    an instruction cache connected to the central processing unit, the private memory and the secure memory, the instruction cache temporarily storing recently used instructions from the private memory and the secure memory for possible reuse by the central processing unit; and wherein a memory page of the memory management unit translation table including the activation sequence of instructions and the secure mode environment setting sequence of instructions is non-cacheable.

12. The digital system of claim 7, further comprising:

an instruction cache connected to the central processing unit, the private memory and the secure memory, the instruction cache temporarily storing recently used instructions from the private memory and the secure memory for possible reuse by the central processing unit, and the instruction cache disabled instruction caching during execution of the activation sequence of instructions and the secure mode environment setting sequence of instructions.

* * * * *